July 14, 1931.  R. SHAFFER  1,814,572
FERTILIZER DISPENSING DEVICE
Original Filed Sept. 6, 1927  2 Sheets-Sheet 1
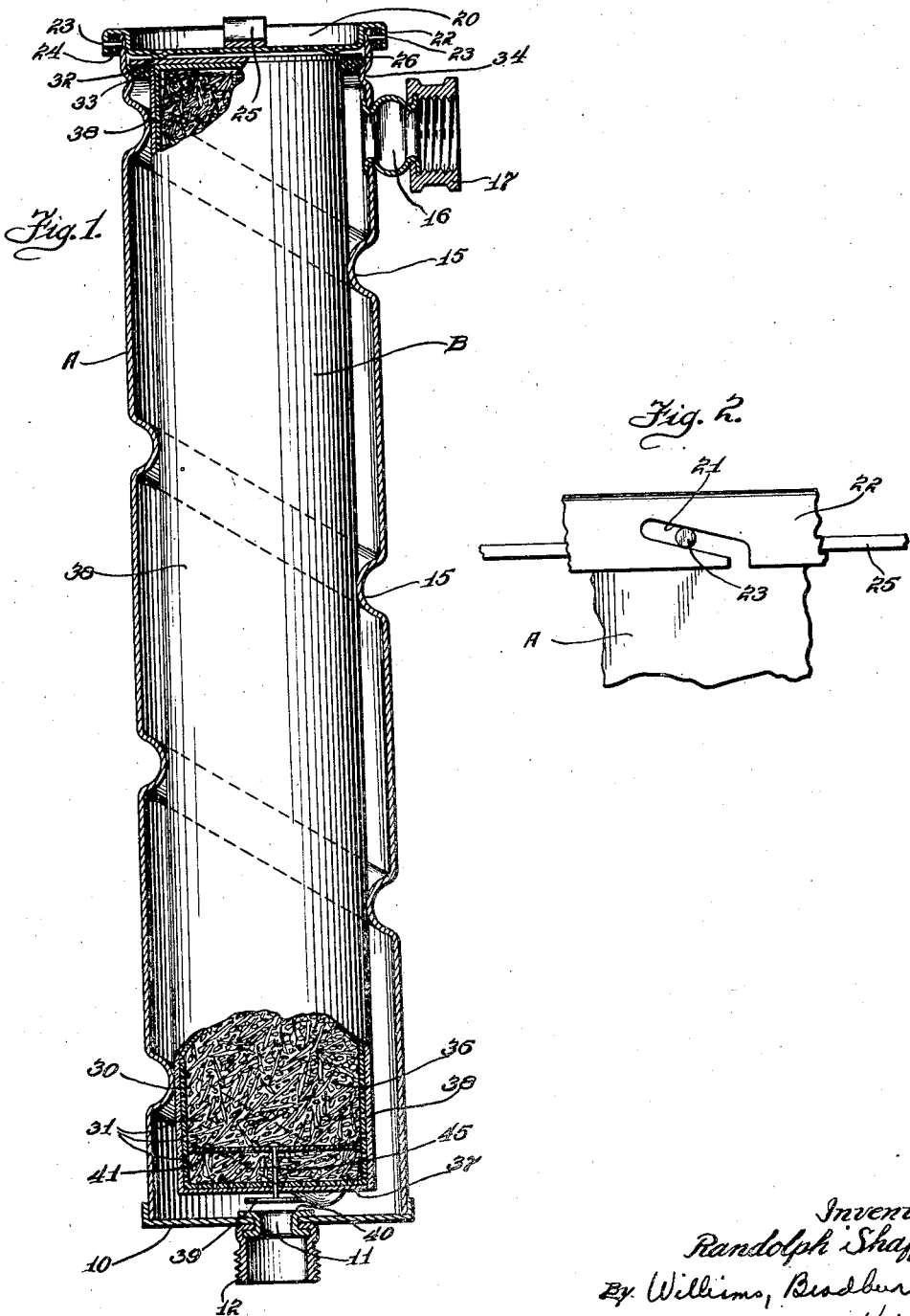
Inventor
Randolph Shaffer
By Williams, Bradbury,
McCaleb & Hinkle
Attorneys

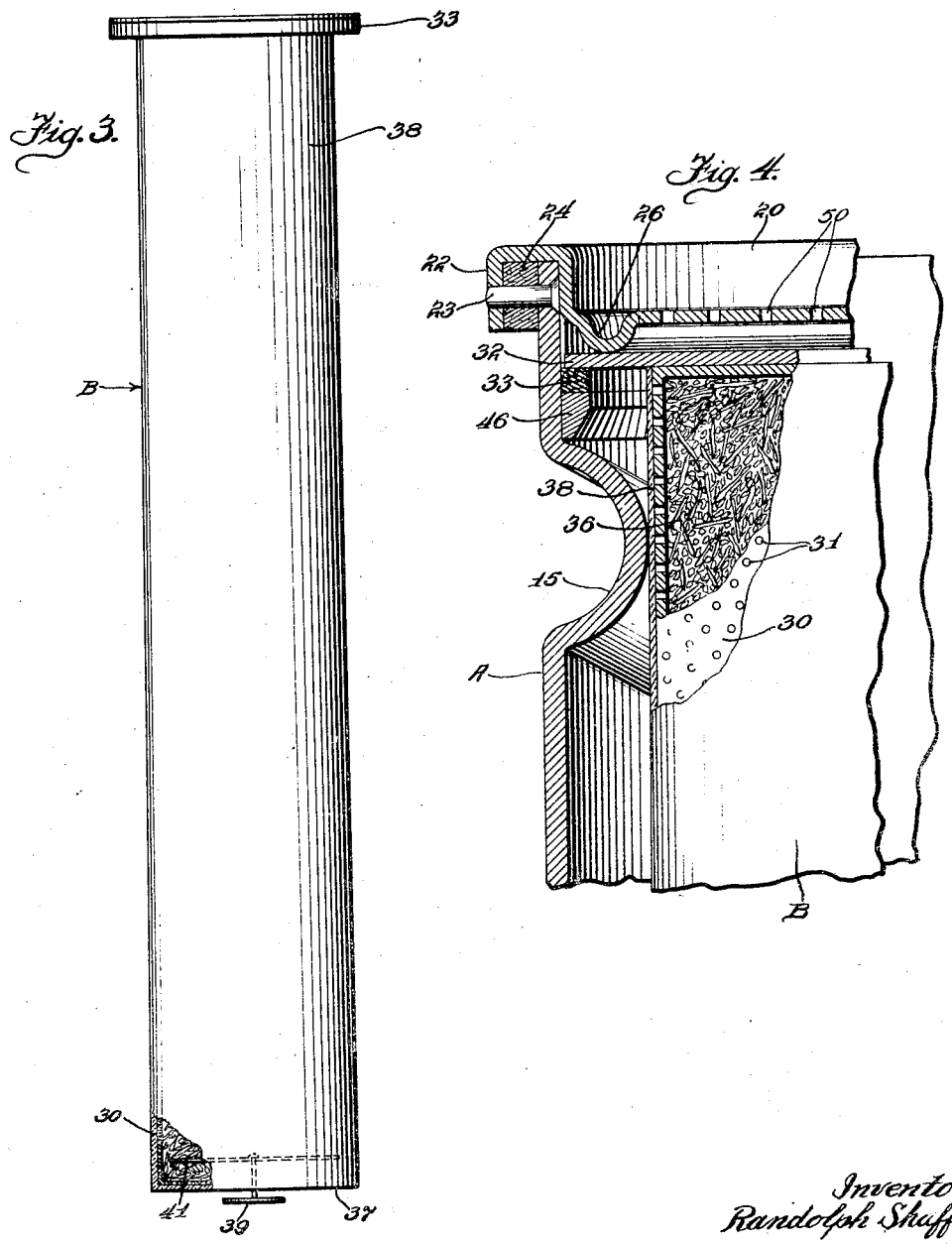

Patented July 14, 1931

1,814,572

UNITED STATES PATENT OFFICE

RANDOLPH SHAFFER, OF ATLANTA, GEORGIA

FERTILIZER DISPENSING DEVICE

Application filed September 6, 1927, Serial No. 217,617. Renewed December 1, 1930.

My invention relates to improvements in fertilizer dispensing devices.

The invention will be explained as embodied in a fertilizer dispensing device of the portable type intended for use in connection with the ordinary garden or lawn watering hose.

While the invention is primarily intended for the dispensing of fertilizing ingredients it may be used with equal success for dispensing poisons, insecticides, fire extinguishing chemicals, or like water soluble materials.

One of the objects of the invention is to provide an improved fertilizer dispensing device.

Another object is to provide a fertilizer dispensing device in which the fertilizer is supplied in the form of cartridges which, when exhausted, may be replaced with fresh cartridges.

A further object is to provide an improved fertilizer cartridge.

Another object is to provide a fertilizer dispensing device whereby the flow of water is shut off when the contents of the cartridge is consumed.

Another object is to provide a fertilizer dispensing device whereby a substantially uniform impregnation of the water by the fertilizing ingredients is assured, regardless of variation in water pressure.

Another object is to provide a fertilizer dispensing device in which the water stream is uniformly impregnated with fertilizer ingredients throughout the entire length of time required to completely consume the contents of the cartridge.

Other objects and advantages of my invention will appear more fully from the following description and from the accompanying drawings in which similar characters of reference indicate similar parts throughout the several views.

In the drawings:

Fig. 1 is a sectional view of the fertilizer dispensing device;

Fig. 2 is an enlarged fragmentary view of a part of the device illustrated in Fig. 1;

Fig. 3 is a view of the fertilizer cartridge with a part thereof broken away; and Fig. 4 is an enlarged sectional view of a modified form of the cartridge seal.

In general the fertilizer dispenser comprises a metal shell A through which water is permitted to flow, and a cartridge B containing readily soluble fertilizer ingredients disposed within the shell for impregnating the water stream with the ingredients.

Shell A is closed at its outer end by head 10, which has a central discharge opening 11 communicating with an externally threaded neck 12 carried by head 10. Neck 12 is constructed for connection with the ordinary type of hand sprinkler nozzle or to a short hose connection having a sprinkler nozzle at its opposite end.

Shell A is fashioned with an inwardly extending rolled spiral bead or vane 15, the innermost portions of which just touch the outer wall of cartridge B throughout its entire length to form a spiral deflector for the water. An inlet port 16 is provided in the side wall of shell A adjacent to the inner end of the shell and carries a rotatable internally threaded coupling member 17 by means of which the discharge end of the ordinary type of garden hose may be connected with the shell. Thus, water passing through the shell must traverse the entire circumferential surface of cartridge B with a velocity determinable by the pressure of water admitted through inlet port 16.

A removable cover or cap 20 is provided for the inner end of shell A which is held in place by the provision of bayonet slots 21 in the side walls 22 of the cover which engage with diametrically opposed pins 23 extending radially from shell A. A reinforcing band 24 encompasses shell A at its mouth and pins 23 extend through band 24, thus rendering a substantially rigid mouth portion for the shell as well as a rigid support for pins 23. Cap 20 has a wing plate 25 fixed thereto and extending across the top of the cap forming a hand clasp to facilitate the removal and replacing of the cap. The cap is further formed with a concentric inwardly extending annular embossed portion 26 which bears upon the head of the cartridge B.

Cartridge B consists of a foraminous cylindrical shell 30 of suitable relatively insoluble material, such as metal, metal foil, fibre or paper, having its side walls and outer end perforated as shown at 31. The head of the cartridge is formed with a metal disc 32 which extends beyond the side walls of the cartridge to form a flange and has affixed thereto on the underside, an annular gasket 33 which bears upon an inwardly extending annular ledge in the form of a bead 34 rolled in shell A adjacent to the inner end of the shell. The embossed annular bead 26 of cap 20 bears upon disc 32 to cause a liquid-tight engagement between the gasket and ledge 34, thus sealing the cartridge within the shell so that all water passing into the shell through the inlet 16 must travel about the cartridge and out through central discharge opening 11. The length of cartridge B is less than the depth of shell A so that the free flow of water through discharge opening 11 is unhampered.

I prefer to employ as fertilizer material a salt 36 known as urea which is highly soluble in water and which contains large quantities of nitrogen, although other water soluble materials may be employed, which contains fertilizer, ingredients, such as ammonium sulphate, sodium nitrate, ammonium phosphates, ammonium nitrate, ammonium sulphate-nitrate, ammonium chloride, calcium nitrate, water soluble nitrogen salts, soluble synthetic nitrogen salts and leuna saltpeter.

In order to insure gradual consumption of the fertilizing material 36 and the dissolution of successive subportions of the material from one end of the cartridge to the other the shell foramina are filled or coated with a material which, although relatively soluble in water, is stable under ordinary atmospheric conditions. This soluble closure for the shell foramina has a varying characteristic at different portions of the cartridge shell to insure a difference in the time of opening or uncovering the foramina to the passage of water therethrough and thereby effect a progressive dissolution of the soluble fertilizer ingredients contained in the shell. To accomplish this result I dip the cartridge shell in a gelatine while in liquid condition. This forms a thin film of gelatine on the outside of the cartridge shell. The cartridge is then stood on end with the head 32 up and as the gelatine hardens some of it runs down toward the bottom or outer end 37, thus forming a coating of gelatine over the cartridge shell which is relatively thin at the inner or entrance end and which gradually increases in thickness toward the outer or lower end, i. e. the discharge end. This tapering gelatinous deposit is indicated at 38. Obviously other water soluble materials not having too great an affinity for water may be employed in place of the gelatine.

In order to assure uniform contact between the bead or vane 15 and the outermost portion of cartridge B, the shell of the cartridge may be made slightly smaller at its outer end to compensate for the thicker portion of the gelatine deposit 38.

A valve for automatically stopping the flow of water through shell A when the contents 36 of the cartridge is consumed consists in a valve disc 39 of a size sufficient to cover the adjacent face 40 of the inner end of discharge opening 11 which face, is formed with a flat surface. Valve disc 39 has secured to its inner side a rod 45 which extends through outer end 37 of the cartridge shell and has fixed to its inner end a perforated disc 41. Disc 41 is spaced a short distance away from end 37 of the cartridge shell. The space between disc 41 and end wall 37 is filled with the fertilizer ingredients 36. When this portion of the ingredients is dissolved disc 41 is forced toward wall 37 by impingement of water against valve disc 39 and water pressure on the inner side of disc 41 to cause valve disc 39 to seat upon face 40 and thus shut off the flow of water through discharge opening 11.

In operation shell A is connected by coupling 17 to a water faucet or water hose supply and by coupling 12 directly or through a length of hose to a nozzle or other water distributing device. When the water is turned on it will pass through shell A in a spiral path over the entire surface of cartridge B. Gasket 33 serves to prevent the escape of water through cap 20 of shell A. The gelatine 38 at the inner end of the cartridge being thinner than the remainder of the deposit will first dissolve so that water will be admitted through the adjacent perforations 31 in the cartridge shell and dissolve the urea or fertilizer ingredients 36 which water thus impregnated will pass on out through the discharge opening 11 upon the lawn or other area to be fertilized. As the bead or vane 15 compels movement of the water over the entire cartridge surface the gelatine will be dissolved and successive subportions of fertilizing ingredients 36 within cartridge B will be dissolved to impregnate the water stream until the entire contents of the cartridge is consumed.

Should the water pressure vary, the quantity of fertilizer ingredients in a given volume of water discharged from the outlet of the container will remain substantially constant due to the fact that the helical path through which the water travels builds up in the water stream within shell A centrifugal force increasing with increased pressure which tends to throw the water toward the inner walls of shell A and decreases somewhat the tendency of water to enter through foramina 31. Despite the action of centrifugal force in keeping the high pressure stream away from the cartridge, the greater water pressure and the greater rapidity of the flow of water is expected still to dissolve the fertilizer ingredients at a rate substantially correct for the increased flow in water, that is, about the same as that for the smaller flow of water at the lower pressure. Another factor which contributes to the desired result is the fact that the more rapidly flowing water will more readily dissolve the gelatine which covers or fills the cartridge foramina and thereby will increase the rapidity with which the fertilizer is dissolved.

The combination of the helical path for the water with the action of centrifugal force and the ability to give the foramina filler a varying characteristic at different regions puts it within the control of the manufacturer to adjust the richness of the water and fertilizer mixture delivered from the device in such a way that it will in a large measure adjust itself to varying water pressures and will remain substantially uniform until a cartridge is exhausted.

When the fertilizer ingredients have been consumed down to disc 41 and that portion of the ingredients between disc 41 and that portion of the ingredients between disc 41 and wall 37 is dissolved, pressure upon disc 41 and valve disc 39, by virtue of the movement of water out of discharge opening 11, will cause disc 41 to move outwardly toward the outer end of the cartridge as the ingredients continue to dissolve and valve disc 39 will engage with surface 40 to stop the flow of water from the device.

This automatically shutting off of the flow of water when the cartridge has been exhausted not only serves to indicate to the operator that the cartridge is exhausted but prevents the unnecessary wasting of water in the event that the device is turned on and the nozzle directed upon an area to be fertilized and left in that position. This latter phase in the operation of the automatic valve is quite important since it permits the use of the device without personal attendance.

When cartridge B has been entirely dissipated of its contents, cap 20 is removed and a fresh cartridge is replaced in shell A, whereupon the device is again ready for use. Since each cartridge carries its own gasket for sealing the cartridge within the shell, the disadvantages attendant with the deterioration of gaskets are eliminated and a gasket of less costly material, but sufficient to stand up for the time necessary to entirely consume the contents of the cartridge may be used.

The gelatinous deposit covering the entire perforated area of cartridge B adequately serves to prevent deterioration or softening of the contents thereof prior to the time that the cartridges are used and particularly during the time when they are in the care of a retail merchant, in store rooms and display rooms and subjected to varying atmospheric conditions. The highly soluble salts employed in a device of this type readily soften and dissolve which renders them practically useless for the purpose herein intended upon subjection to humid atmosphere.

The cap 20 is provided with a plurality of perforations 50 so that the device will not function properly with any but a cartridge of proper construction having a gasket such as the gasket 30, and a solid head or disc 32. Thus a person not informed of the proper use of the device cannot successfully operate the device by filling the shell with soluble material or by using a shell of improvised construction. Although neither of the latter combinations could operate as a fertilizing dispensing device, the use of the perforated shell with such a combination immediately gives notice of the impossibility of performance.

In Fig. 4 I have shown a modified construction in which I have dispensed with the annular bead 34 as an integral part of shell A and substituted therefor a ledge in the form of a ring 46 which is fixed to the inner wall of the shell A and which has a flat gasket engaging surface 51 perpendicular to the side walls of the shell. In all other respects this modification is identical in its construction and operation with that herein described.

Having thus illustrated and explained the nature of my invention, what I claim and desire to secure by United States Letters Patent is as follows:

I claim:

1. In a device for producing solutions, the combination of a casing having an inlet and an outlet, a perforated cartridge in the casing, water soluble material in the cartridge, a spiral vane between the inner wall of the casing and the outer wall of the cartridge, and a water soluble coating covering the cartridge, the thickness of the coating being greater at one end of the cartridge than at the other.

2. In a device for producing solutions, the combination with a casing having an inlet and an outlet, a perforated cartridge in the casing, water soluble material in the cartridge, a spiral vane between the inner wall of the casing and the outer wall of the cartridge, and means associated with the cartridge and the outlet of the casing operable upon the dissolution of the soluble material for stopping the flow of water through the outlet.

3. In a device for producing solutions, the combination with a casing having an inlet and an outlet, a perforated cartridge in the casing, water soluble material in the cartridge, a spiral vane between the inner wall of the casing and the outer wall of the cartridge, and means operable upon the dissolution of the soluble material for stopping the flow of water through the casing.

4. In a device for producing solutions, the combination with a casing having an inlet and an outlet, a perforated cartridge in the casing, water soluble material in the cartridge, a disc disposed within the cartridge adjacent to that end nearest the outlet of the casing, a valve supported by the disc and normally clear of the outlet opening, said disc being supported by said water soluble material, said valve being so positioned as to close upon the dissolution of the disc supporting material.

5. In a device for producing solutions, a perforated cartridge, water soluble material in the cartridge, and a water soluble coating covering the perforated portion of the cartridge, said coating being of varying thickness throughout the length of the cartridge.

6. A refill cartridge for a solution dispensing device comprising a foraminous insoluble shell, water soluble material in the shell, and a normally stable but water soluble filler for the shell foramina to protect the ingredients against atmospheric moisture but permit them to be attacked by water, the filler for the shell foramina varying in thickness at different regions of the shell to effect a difference in the time of opening the foramina to water.

In witness whereof, I hereunto subscribe my name this 30th day of August, 1927.

RANDOLPH SHAFFER.